(12) United States Patent
Palmer

(10) Patent No.: US 6,796,574 B2
(45) Date of Patent: Sep. 28, 2004

(54) ELONGATE RECEIVER TUBE AND METHOD OF MAKING THE SAME

(75) Inventor: David H. Palmer, Jonesville, MI (US)

(73) Assignee: Jems of Litchfield, Litchfield, MI (US)

(*) Notice: Subject to any disclaimer, the term of this patent is extended or adjusted under 35 U.S.C. 154(b) by 49 days.

(21) Appl. No.: 10/096,231

(22) Filed: Mar. 12, 2002

(65) Prior Publication Data

US 2002/0149173 A1 Oct. 17, 2002

Related U.S. Application Data

(60) Provisional application No. 60/284,050, filed on Apr. 16, 2001.

(51) Int. Cl.$^7$ .................................................. B60D 1/01
(52) U.S. Cl. ...................................... 280/495; 72/370.11
(58) Field of Search ........................... 72/370.15, 370.11; 280/504, 511, 515, 495

(56) References Cited

U.S. PATENT DOCUMENTS

| | | | |
|---|---|---|---|
| 1,046,138 A | * 12/1912 | Babbitt | |
| 2,061,628 A | 11/1936 | Huck | |
| 2,227,820 A | * 1/1941 | Bratz | ............... 29/156 |
| 2,464,510 A | 3/1949 | Hull | |
| 2,797,726 A | 7/1957 | Granville | |
| 3,119,435 A | 1/1964 | Greenman | |
| 4,362,043 A | 12/1982 | Hanson | |
| 4,754,634 A | 7/1988 | Murata | |
| 4,980,961 A | 1/1991 | Caudill | |
| 5,090,611 A | * 2/1992 | Takikawa | ............ 228/173.4 |
| 5,203,194 A | 4/1993 | Marquardt | |
| 5,904,063 A | 5/1999 | Owens | |
| 6,408,672 B1 | * 6/2002 | Roe | ............... 72/370.11 |

* cited by examiner

Primary Examiner—Daniel G. DePumpo

(57) ABSTRACT

A receiver tube for a trailer hitch assembly including a hollow metal tube stock wherein the receiving end thereof is provided with a cold formed reinforcing flange formed of the outermost end of the tube stock is folded upon itself.

3 Claims, 5 Drawing Sheets

ELONGATE RECEIVER TUBE AND METHOD OF MAKING THE SAME

This application claims the benefit of U.S. provisional patent application Ser. No. 60/284,050, filed Apr. 16, 2001.

BACKGROUND OF THE INVENTION

1. Field of the Invention

The present invention relates to a trailer hitch assembly and more particularly to an elongate receiver tube for a trailer hitch assembly and a method of making the same.

2. Description of the Prior Art

Trailer hitches employed in conventional motor vehicles include a receiver tube permanently affixed to the motor vehicle and is adapted to receive a removable trailer hitch bar. The receiver tube is typically affixed to the vehicle frame and may include additional cross bracing. The exposed end of the receiver tube is open to receive the removable trailer hitch bar. A mounting ball adapted to receive a trailer tongue is typically mounted on the exposed end of the trailer hitch bar.

The exposed end of the receiver tube is exposed to considerable lateral and up and down forces during use. In order to compensate for these forces, the ends of the receiver tubes have been reinforced. Such reinforcement includes the use of a reinforcement ring which is slid over the end of the receiver tube end and welded in place. Such a welded construction includes a weld bead which is a corrosion site adversely affecting the life cycle of the assembly.

Another method has been developed wherein the trailer hitch receiver tube end was reinforced by a metal forming process. The process is carried out with a tube stock at an elevated temperature of about 1800° F. and was upset to form a reinforcement bead around the entire peripheral of the tube. The process is referred to as a "hot upset" operation.

It is an object of the present invention to produce an elongate receiver tube wherein the exposed end is reinforced by a cold forming process to form a crimped reinforcement flange thereon.

Another object of the invention is to produce a method for cold forming a crimped flange on the end of the elongate receiver tube for a trailer hitch assembly.

SUMMARY OF THE INVENTION

The above, as well as other objects and advantages of the invention may be readily achieved by an elongate receiver tube and method for making the same wherein the elongate receiver tube for a trailer hitch assembly comprises an elongate tube having an internal rectangular cross-section and having one end adapted to receive a trailer hitch bar having a complimentary outer rectangular cross-section, the one end of the tube having an integral reinforcement construction wherein the end of the tube is provided with an outwardly extending fold formed of two thicknesses of the tube including the outermost end portions are folded against one another by a cold forming process to form a peripheral outwardly extending fold at the end of the tube, the fold having an inner dimension which is the same as the inner dimension of the tube and an outer dimension greater then the outer dimension of the tube.

BRIEF DESCRIPTION OF THE DRAWINGS

The objects and advantages of the invention will become readily apparent to those skilled in the art from considering the following detailed description of an embodiment of the invention in the light of the accompanying drawings, in which.

DESCRIPTION OF THE PREFERRED EMBODIMENT

Figure 1:
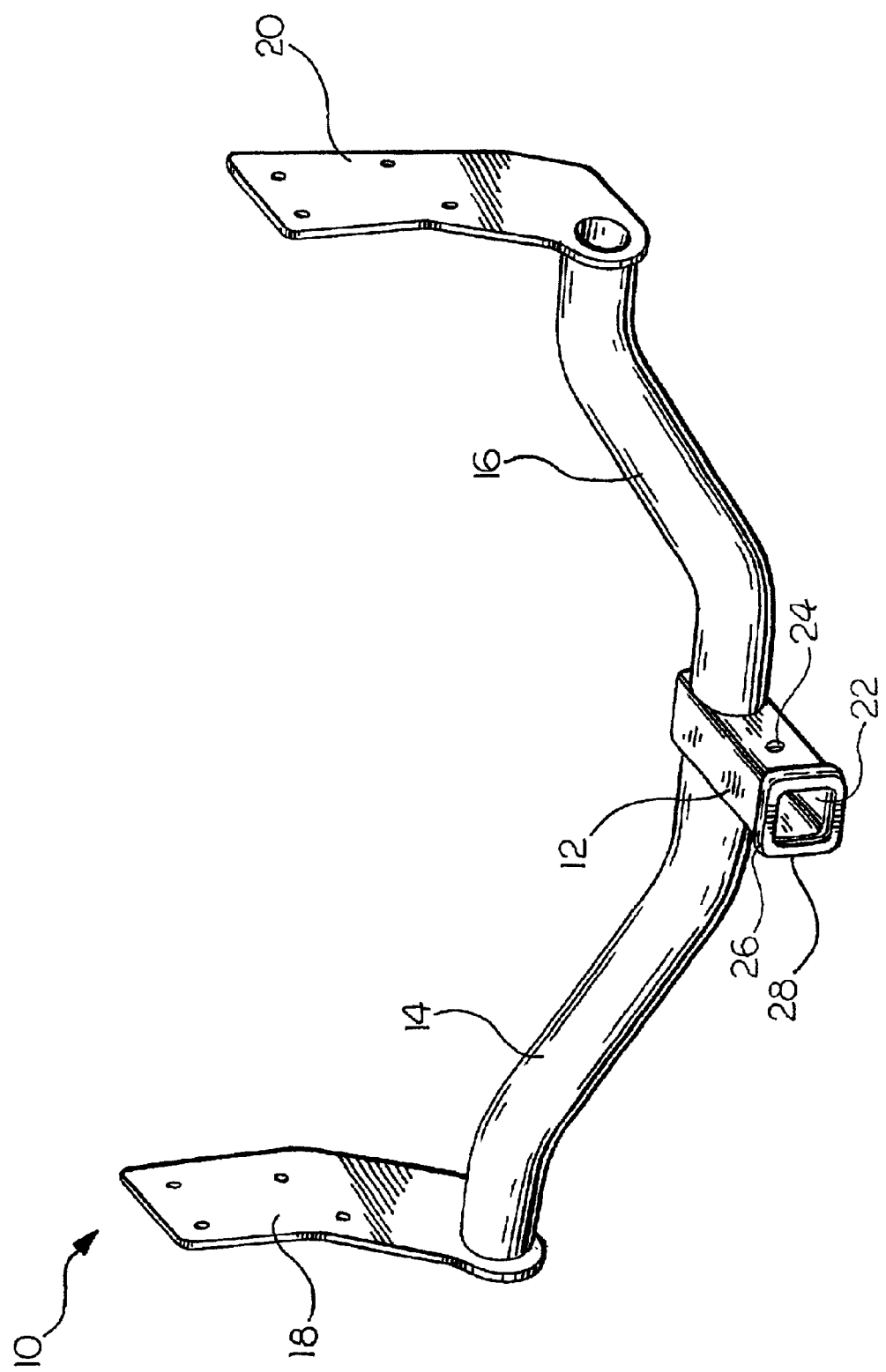
FIG. 1 is a fragmentary perspective view of a trailer hitch assembly incorporating the features of the present invention.

Referring to the drawings, there is illustrated a trailer hitch assembly generally indicated by reference numeral 10. The trailer hitch assembly 10 typically includes an elongate receiver tube 12, and cross members 14 and 16, connected to respective vehicle frame members 18 and 20.

Figure 2:
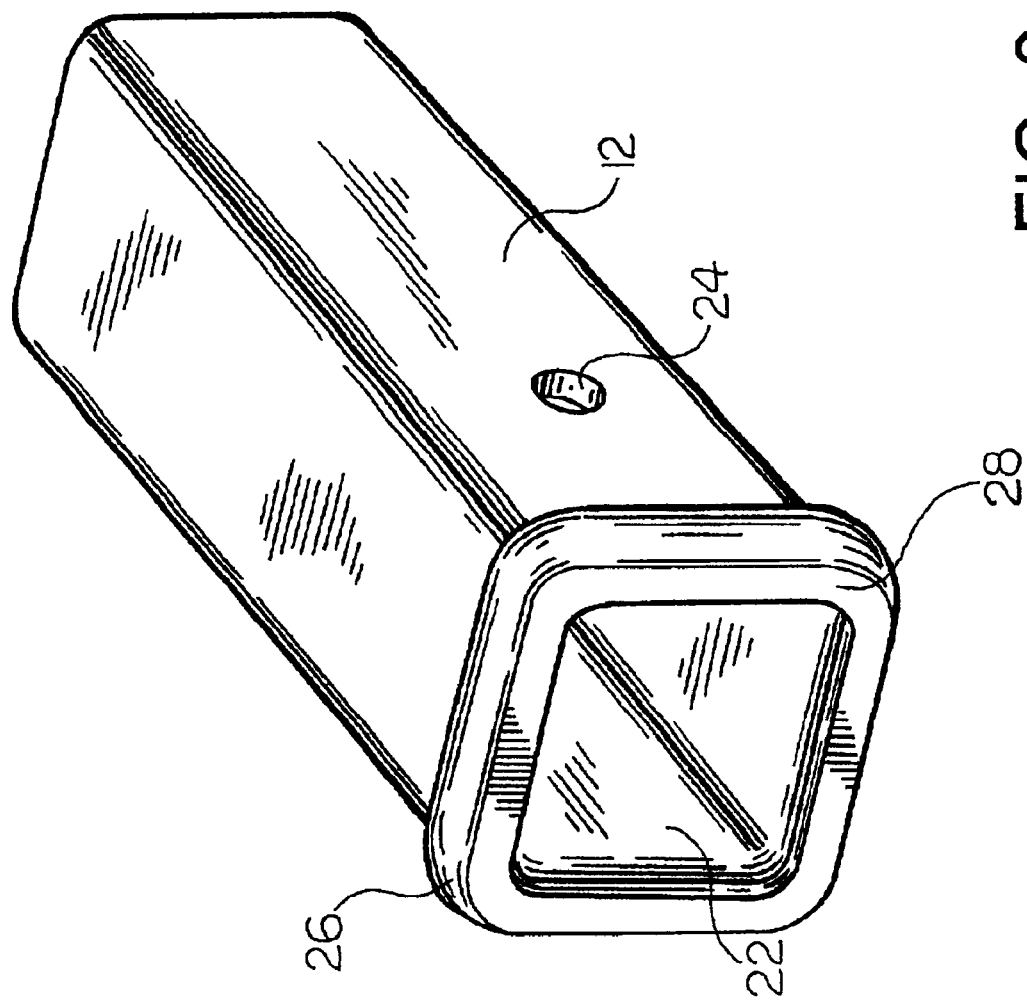
FIG. 2 is an enlarged fragmentary perspective view of the receiver tube incorporating the present invention as illustrated in FIG. 1.

The receiver tube 12 is provided with a hollow interior 22, as clearly illustrated in FIG. 2 which receives a trailer hitch bar, not shown. The trailer hitch bar is slid into the interior 22 of the receiver tube 12 until connecting holes are aligned to receive an appropriate locking pin. The outwardly projecting end of the trailer hitch bar is typically provided with a mounting ball adapted to support the tongue of an associated trailer.

Figure 3:
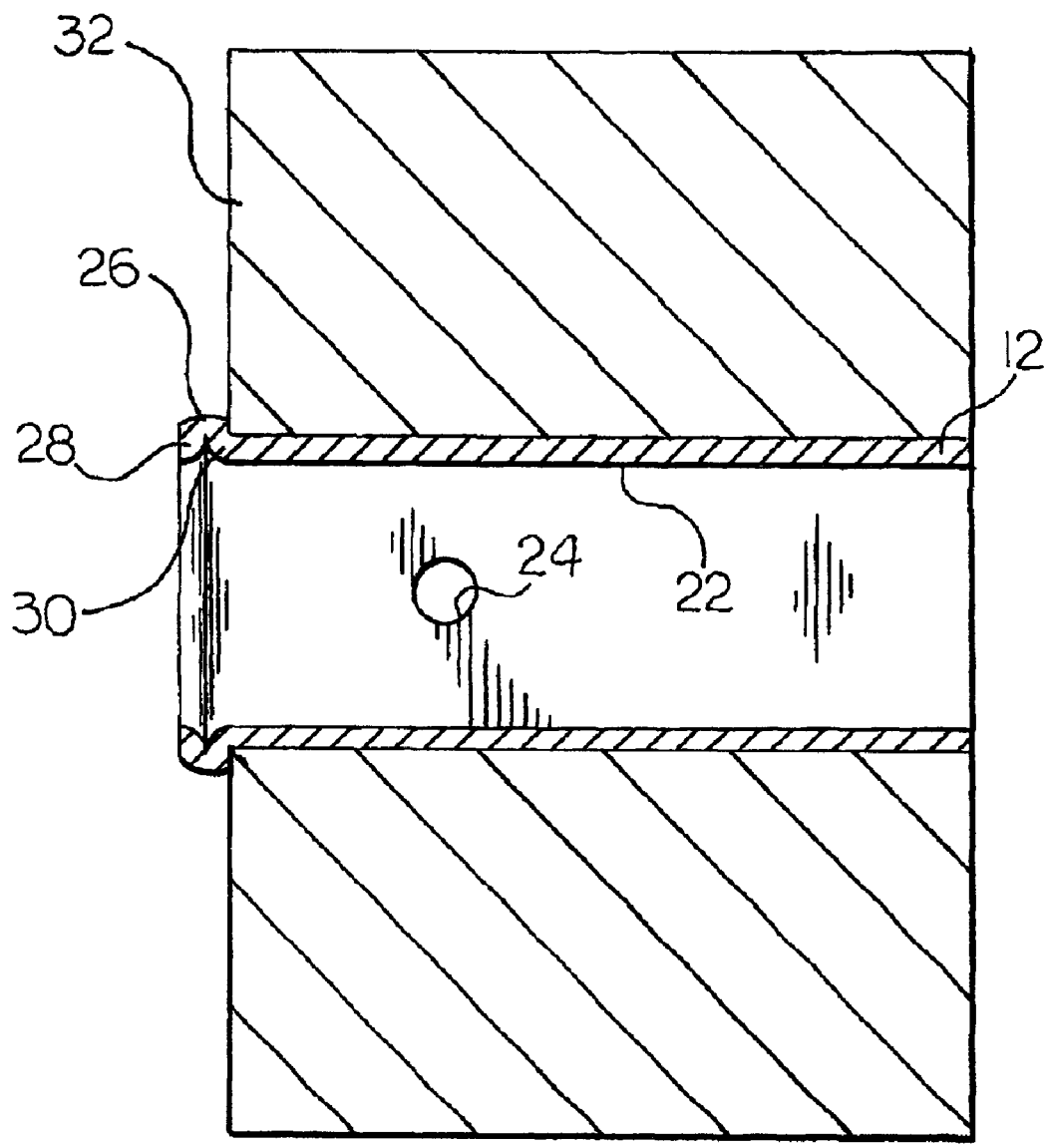
FIG. 3 is a cross-sectional elevational view of a portion of the tooling required to form the reinforcement at the end of the elongate receiver tube illustrated in FIGS. 1 and 2.
Figure 4:
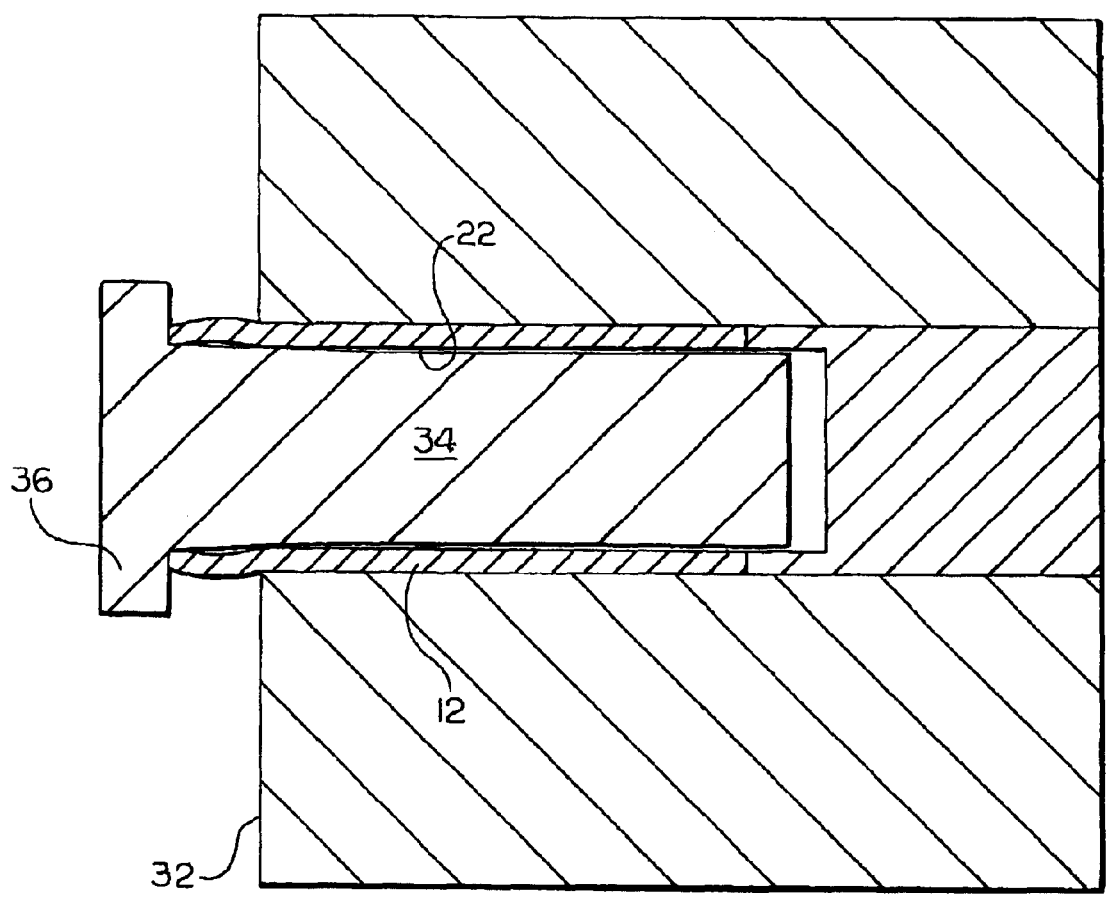
FIG. 4 is a cross-sectional elevational view of a portion of the tooling required to form the reinforcement at the end of the elongate receiver tube illustrated in FIGS. 1 and 2 at the point in the process where contact is made between the punch and the receiver tube.
Figure 5:
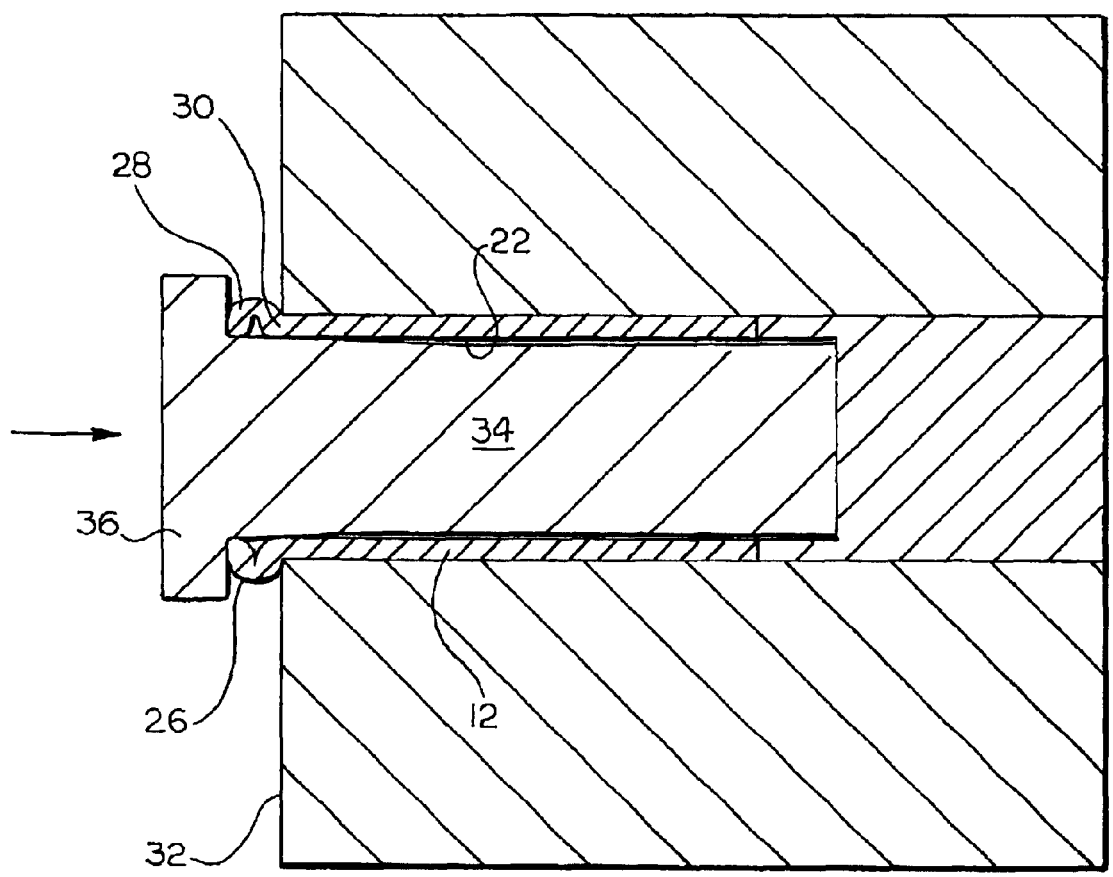
FIG. 5 is a cross-sectional elevations view of a portion of the tooling required to form the reinforcement at the end of the elongate receiver tube illustrated in FIGS. 1 and 2 at the point in the process where the reinforcement flange has been formed.

The construction of the receiver tube 12 includes a reinforcment flange 26, which extends completely around the outermost peripheral edge. The reinforcement flange 26 is best illustrated in FIG. 3 wherein it is shown that the reinforcement flange 26 is formed of two thicknesses of the wall of the tube 12 including the outermost end portion 28 which is folded against another thickness 30. The resultant reinforcement includes the peripheral outwardly extending flange 26 formed of the thicknesses 28 and 30 folded on themselves at the end of the tube 12. The reinforcement flange 26 has an inner dimension which is the same and typically slightly larger than the inner dimension of the tube 12 and an outer dimension greater than the outer dimension of the outer surface of the tube 12.

The formed reinforcement flange 26 adds strength to the end of the receiver tube 12 to assist in withstanding the stresses applied thereto by the associated trailer hitch bar during use.

The reinforcement flange 26 is formed by a cold metal forming process wherein the tube stock used to form the receiver tube 12 is placed in a clamp 32 to secure the outside surface to a predetermined length. Next, a single punch 34 having the same cross sectional configuration as the interior of the receiver tube 12 to be strengthened is inserted into the hollow interior 22 of the tube 12. The outer surfaces of the punch 34 are effective to support the tube 12 during the following cold forming crimping process. It will be understood that one end of the tube 12 stock extends beyond the clamp 32 to provide sufficient length of unsupported tube stock to form the desired strengthening crimped flange 26.

Next, the punch 34 is further inserted into the interior 22 of the receiver tube 12 to commence formation of the crimped reinforcement flange 26. The punch is advanced into the hollow tube interior 22 causing equal wall thicknesses in the end portion of the tube 12 to be forced against the clamp 32 causing the unsupported tube end to be trapped outside of the clamp 32 thus preventing the equal wall thickness of the receiver tube 12 from being deformed during the cold forming process. The punch 34 is caused to continue the inward movement until a circumferentially outwardly. extending shoulder 36 of the punch 34 meets the unsupported end of the tube 12 and continues until the unsupported tube stock folds outwardly to a developed limit. When the limit is reached, the punch 34 continues and causes the material of the receiver tube 12 to buckle and fold inwardly upon itself until the desired cross-sectional configuration is achieved. The movement of the punch 34 is stopped and the punch 34 is withdrawn.

It has been surprisingly determined that the cold formed folded upon itself reinforcement flange 26 including the metal stock thicknesses 28 and 30 has increased reinforcement and life cycle characteristics to any other known receiver assemblies.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A method of cold forming an elongate receiver tube for a trailer hitch assembly comprising the steps of:

providing an elongate length of metal tube stock having an outside surface and a hollow interior defined by an interior surface;

securely clamping the outside surface of the metal tube stock leaving a predetermined length of the metal stock outside of a cavity of a clamp and unsupported by the clamp;

inserting a punch within the interior of the metal tube stock and supporting a portion of the length of the interior surface of the metal tube stock inside the cavity of the clamp and contacting the unsupported length of the metal tube stock outside of the clamp; and forcing the punch to cause the predetermined length of the metal tube stock outside of the clamp until the predetermined length of the metal tube stock folds outwardly to a developed limit and then causes the stock to fold inwardly upon itself until a desired cross-sectional configuration is achieved, the folds occurring outside of an axial extent of the cavity of the clamp.

2. A method of cold forming an elongate receiver tube for a trailer hitch assembly comprising the steps of:

providing an elongate length of hollow metal tube stock;

securely clamping an outside surface of the metal tube stock leaving a predetermined length of the metal stock outside of a cavity of a clamp and unsupported by the clamp, the clamp having an internal surface with a substantially constant rectangular cross section over its entire length;

inserting a punch having a portion extending within an interior of the metal stock and supporting a first portion of the metal stock in the cavity of the clamp and having a second portion contacting the predetermined length of the stock outside of the clamp; and forcing the punch to cause the predetermined length of the stock outside of the clamp until the predetermined length of the stock folds outwardly to a developed limit and then causes the stock to fold inwardly upon itself until a desired cross-sectional configuration is achieved, the folds occurring outside of an axial extent of the cavity of the clamp.

3. A method of cold forming an elongate receiver tube for a trailer hitch assembly comprising the steps of:

providing an elongate length of hollow metal tube stock;

axially restraining the metal tube stock in a first cavity of a clamp and leaving a predetermined length of the metal stock outside of the first cavity of the clamp and unsupported by the clamp;

inserting a punch having a portion extending within an interior of the metal stock and supporting a first portion of the metal stock in the cavity of the clamp and having a second portion contacting the predetermined length of the stock outside of the clamp; and forcing the punch to cause the predetermined length of the stock outside of the clamp until the predetermined length of the stock folds outwardly to a developed limit and then causes the stock to fold inwardly upon itself until a desired cross-sectional configuration is achieved, the desired cross-sectional configuration reached by causing the predetermined length of the stock to be formed in a free flow fashion outside of an axial extent of the first cavity of the clamp, wherein contact with a lateral supporting surface outside of the first cavity is avoided.

* * * * *